June 2, 1959 M. STAUNT 2,888,748
DENTAL HANDPIECES
Filed Nov. 30, 1956
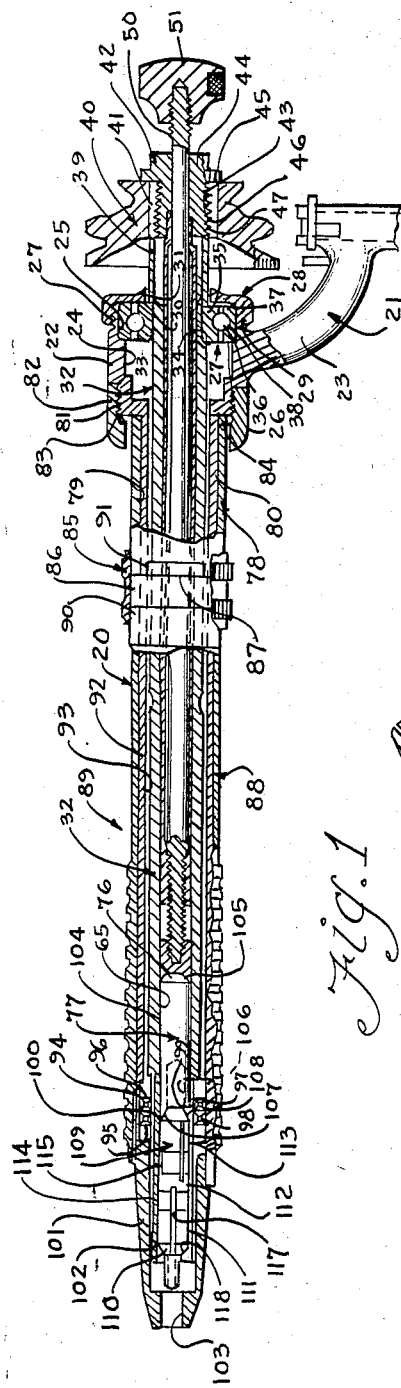
INVENTOR.
Martin Staunt
BY Robert H. Wendt
Attorney United States Patent Office 2,888,748
Patented June 2, 1959

2,888,748

DENTAL HANDPIECES

Martin Staunt, Des Plaines, Ill.

Application November 30, 1956, Serial No. 625,317

1 Claim. (Cl. 32—26)

The present invention relates to dental handpieces, and is particularly concerned with improvements in the chuck assembly and chuck actuating mechanism.

One of the objects of the invention is the provision of an improved dental handpiece which is adapted to be run at very high speeds above 150,000 r.p.m. without excessive vibration such as results with the handpieces of the prior art, when provided with the chuck assemblies of the prior art.

Another object of the invention is the provision of an improved chuck actuating mechanism for dental handpieces, including a collet actuating member and a chuck rod, which is provided with threaded means for driving the chuck actuating member, located close to the actuating member, as distinguished from the devices of the prior art in which the chuck rod is provided with driving threads at the rear end of the handpiece.

Another object of the invention is the provision of an improved dental handpiece which is simple in construction, durable, capable of economical manufacture, and adapted to be used for a long period of time at high rotative speeds without undue wear of its parts.

Another object of the invention is the provision of an improved chuck actuating and securing mechanism which gives the chuck rod such support that it is prevented from coming loose at high speeds.

Other objects and advantages of the invention will be apparent from the following description and the accompanying drawings in which similar characters of reference indicate similar parts throughout the several views.

Referring to the single sheet of drawings accompanying this specification,

Fig. 1 is a fragmentary axial sectional view taken through a handpiece embodying the invention;

Fig. 2 is a side elevational view in partial section of the chuck rod assembly embodied in the handpiece; and Fig. 3 is a view in perspective of the chuck collet;

Fig. 4 is a view in perspective of the chuck actuating member.

The handpiece is indicated in its entirety by the numeral 20, and it is preferably supported by a wrist joint member 21, having a cylindrical body 22, carried by a curved arm 23.

The cylindrical body 22 has an internal bore 24, communicating with a counterbore 25 for receiving the outer race 26 of a ball bearing assembly 27. The body 22 has a reduced externally threaded portion 27 for receiving an internally threaded ferrule 28, having threads 29 which engage the threads on the reduced portion 27a.

The ferrule has a radially and inwardly extending wall 30, with a central aperture 31, for passing the spindle 32 with a clearance, and the ferrule 28 holds the outer race 26 in the counterbore 25.

The spindle 32 is rotatably mounted at each of its ends by an anti-friction bearing assembly, such as the ball bearings 35, 36, 37, and 38 in the wrist joint, and ball bearings 95, 96, 97, 98, and 99 at the other end of spindle 32 in counterbore 94 of sheath extension 92.

The spindle 32 has a reduced portion 33, terminating at an annular shoulder 34, against which the inner race 35 is seated. The inner race has a ball bearing groove 36, which is partially circular in cross section and is adapted to receive the balls 37, which are also located in a similar groove 38, on the inside of the outer race.

The spindle 32 carries a spacer tube 39, engaging the inner race and engaged by the left end of the pulley 40, which is secured on the adjacent end 41 of spindle 32, by means of a threaded plug 42, which has external threads 43 and a non-circular head 44.

A radial flange 45 engages the pulley 40 and holds it on the spindle, at the same time holding the spacer tube 39 and the inner race 35 in proper position.

The spindle 32 has internal threads 46 for receiving the threaded portion 47 of the threaded plug 42. Threaded plug 42 has a cylindrical bore 48 for receiving the chuck actuating rod 49, which has a reduced threaded end 50 receiving the internally threaded knob 51. (See Fig. 2.)

Knob 51 has a knurled outer edge 52, and has a threaded bore 53 and a smaller counterbore 54. The counterbore 54 is complementary to the reduced end 55 of the chuck rod 49, so that the knob 51 may be driven home on the chuck rod 49. If desired it may also be secured by a transverse pin 56.

The threaded plug 42 has a tubular extension 57, which carries the external threads 47, and has an enlarged counterbore 58. Counterbore 58 receives the reduced end 59 of a chuck rod supporting sleeve 60, which also has a cylindrical bore 61, forming an extension of the cylindrical bore 48 in the plug 42.

The chuck rod supporting sleeve 60 is fixedly secured to the plug 42. The chuck tightening rod 49 is an elongated rod having an external cylindrical surface 62, having a clearance with the counterbore 63 in the chuck rod supporting tube 60.

Chuck rod supporting tube 60 has an external cylindrical surface 64, which fits in the bore 65 of spindle 32. At its left end, Fig. 2, the chuck rod supporting tube 60 has a reduced portion 66, and is provided with an internally threaded portion 67, engaging an externally threaded portion 68 on chuck tightening rod 49. This threaded portion terminates in a reduced cylindrical end 69, fitting in a complementary bore 70, in a knob 71, which has an internally threaded bore 72.

The knob 71 has an external cylindrical surface 73 of the same size as the outside of tube 60. The end of the knob 71 is plane at 74 and the knob is chamfered at 75 on its end. The plane end 74 engages a similar plane end 76 on the collet actuating member 77.

The knob 71 is driven home on the threaded end of chuck tightening rod 49, and this knob prevents the rod from coming out of the handpiece when other attachments are used.

Due to the threads at 68 and 67 the chuck tightening rod 49 moves toward the left when it is rotated clockwise, in Fig. 2, and moves toward the right when it is rotated counterclockwise.

The handpiece has a sheath section 78 which has an internally cylindrical bore 79 fitting on a tubular extension 80 of the wrist joint body 22. Body 22 has a reduced threaded portion 81 for receiving an internally threaded ferrule 82, which has an inwardly extending flange with an annular shoulder 83, engaging the outwardly extending flange 84 on the sheath section 78.

The sheath section 78 is provided with a knurled, rotating sleeve 85, which carries a partially circular ring 86, open at one side and slidably rotating in a complementary groove 87 in the sheath section 78.

This rotating sleeve 85 serves for detachably connecting a second sheath section 88 of an attachment 89, which has its end at 90 engaging the end of sheath 78, but also has a longitudinally extending partially cylindrical tongue 91 that extends into a complementary cutout of the sheath section 78, and has a continuation of the groove 84 to receive the ring 86, which also has the cutout.

Thus the sheath 88 is detachably secured to the handpiece and all of its details except the chuck tightening rod may be substantially as shown in my prior application, Serial No. 494,607, on Dental Handpieces, filed March 16, 1955.

The sheath 88 contains a tubular portion 92, which is an extension of the tube 80, carried by wrist joint body 22, and tubular extension 92 has a bore 93 for receiving the spindle 32 and a counterbore 94 for receiving a pair of ball bearing assemblies 95 and 96.

The ball bearings comprise outer races 97, balls 98, and inner races 99, substantially as described at the other end of the handpiece except that there are two ball bearing assemblies 95 and 96.

The inner races engage the reduced cylindrical portion 100 on spindle 32, and thus the spindle is supported by ball bearings at both of its ends.

The tube 92 supports a nose piece 101, having an internal bore 102, for housing the end of the spindle 32, and the nose piece 101 has a cylindrical bore 103 at its end. The spindle 32 has the collet actuating member 77, located in its bore 65.

Collet actuating member 77 comprises a cylindrical metal member having an outer cylindrical surface 104, and having plane end 76, with a chamfer at 105. At its other end collet actuating member 77 has a bore 106, with a frusto-conical internal surface 107 for engaging a similar frusto-conical surface 108, on the collet 109.

Collet 109 has a similar frusto-conical surface 110 at its other end and has cylindrical surfaces 111, 112 and 113, separated by relief grooves 114, 115 between its ends. The collet 109 has an internal cylindrical bore 116, and each of its ends has inwardly extending splits or slots 117, so that the ends of the collet may be contracted to cause the walls of its bore 116 to grip the shank of a tool or attachment.

The spindle 32 has its bore terminating at a frusto-conical surface 118 which engages the similar surface 110, on that end of the collet, so that the collet tends to be compressed at both its ends when the collet actuating member 77 is moved toward the left.

When the collet actuating member 77 is moved toward the right the resiliency of the collet ends causes them to spring out again and relieves the grip on the shank then in the collet.

It will thus be observed that my improved handpiece assembly includes a chuck tightening rod, which is actuated by threads located close to the collet actuating member, and the threaded portion of the rod is actuated by a knob extending out of the pulley end of the handpiece to tighten or loosen the chuck.

It is found that the present chuck tightening member does not come loose at high speeds as do the devices of the prior art, and also that the present handpiece may be operated at very high rotative speeds with a minimum amount of vibration and a minimum amount of wear.

While I have illustrated and described a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States is:

A dental handpiece assembly adapted to be operated at speeds above 150,000 r.p.m. with a minimum vibration and without loosening of the chuck, comprising a wrist joint having a cylindrical body with a bore and a counterbore and an annular shoulder between them, a ball bearing assembly having an outer race in said counterbore against said annular shoulder, balls in said race and an inner race, a ferrule threaded on the outside of said body, securing the outer race, a cylindrical spindle having a through cylindrical spindle bore with an enlargement at its driving end, having an annular shoulder seated against said inner race on said spindle, threads in the end of said spindle, and a threaded plug engaging said threads and securing a pulley on said spindle, said plug having a cylindrical bore and a counterbore, a cylindrical metal supporting tube having a reduced end and a through cylindrical bore, said reduced end being secured in said latter counterbore, a tubular housing carried by said wrist joint body, and having a through bore enclosing said spindle, a pair of ball bearing assemblies secured in the tool end of said housing and rotatably supporting that end of the spindle, a collet in the tool end of said spindle engaging a contracting surface in the end of said spindle, a collet actuator in the spindle bore engaging the other end of the collet, an elongated chuck actuating rod in said supporting tube and having an outer adjusting knob, a cylindrical knob on the other end of said chuck rod and provided with a fitting bore engaging threads on the end of the chuck rod, said supporting tube being provided with a reduced end, having internal threads engaging the threads on the adjacent end of the chuck rod, said chuck actuating rod causing said cylindrical head to slide in said spindle bore to engage said collet actuator to contract or release said collet responsive to the adjustment of said chuck actuating rod.

References Cited in the file of this patent
UNITED STATES PATENTS

| | | |
|---|---|---|
| 1,381,697 | Bishop | June 14, 1921 |
| 1,697,576 | Shotton | Jan. 1, 1929 |
| 2,538,923 | Staunt | Jan. 23, 1951 |